J. F. LINEHAN.
REAMING TOOL HOLDER FOR PIPE MACHINES.
APPLICATION FILED NOV. 22, 1910.
1,016,889.
Patented Feb. 6, 1912.
2 SHEETS—SHEET 1.
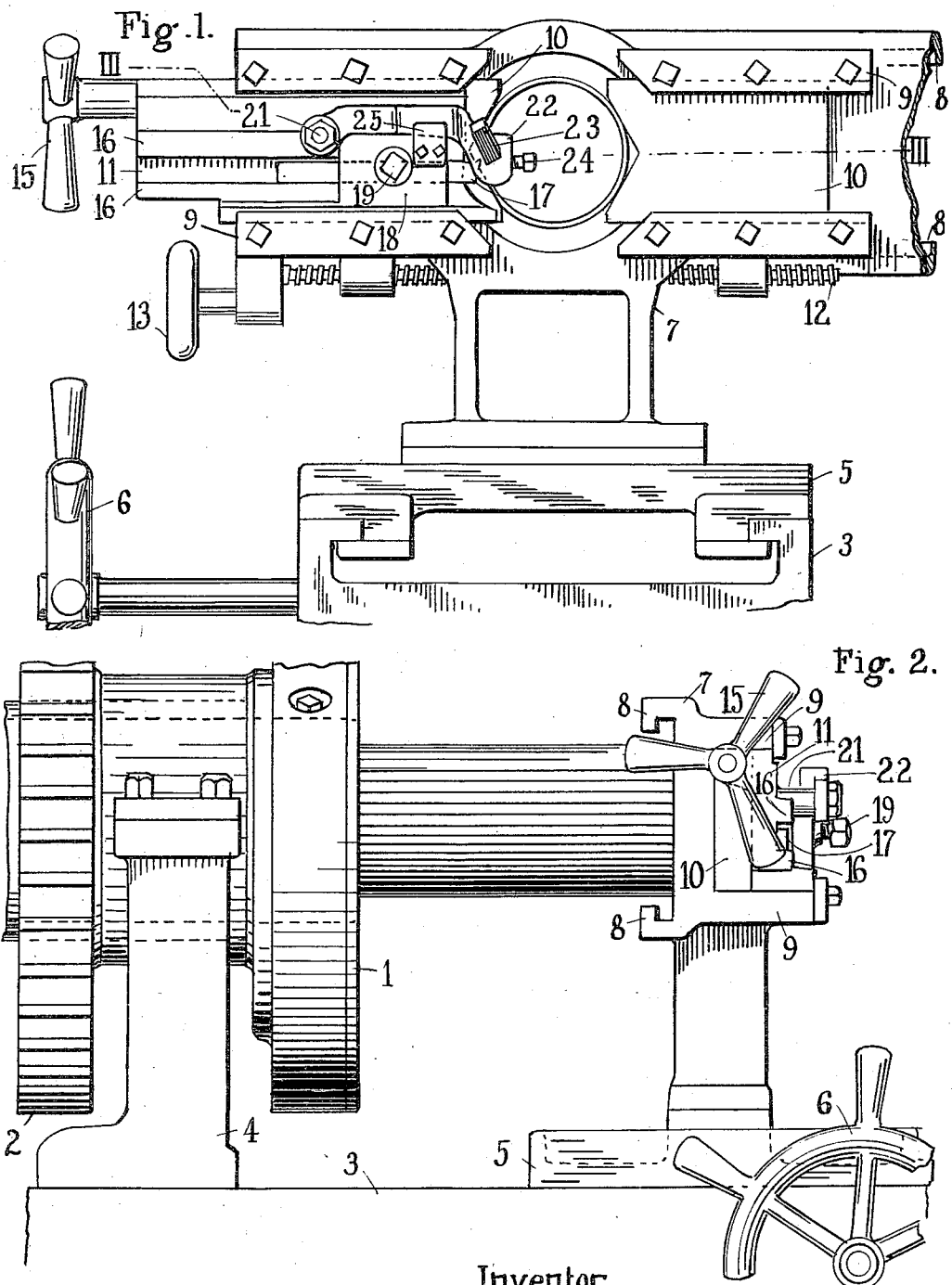
Witnesses:
Inventor,
John F. Linehan,
by Samuel W. Balch
Attorney.

J. F. LINEHAN.
REAMING TOOL HOLDER FOR PIPE MACHINES.
APPLICATION FILED NOV. 22, 1910.

1,016,889.

Patented Feb. 6, 1912.

2 SHEETS—SHEET 2.

Witnesses:

Inventor,
John F. Linehan,
by Samuel W. Balch
Attorney.

UNITED STATES PATENT OFFICE.

JOHN F. LINEHAN, OF YONKERS, NEW YORK, ASSIGNOR TO D. SAUNDERS' SONS, OF YONKERS, NEW YORK, A CORPORATION OF NEW YORK.

REAMING-TOOL HOLDER FOR PIPE-MACHINES.

1,016,889.      Specification of Letters Patent.      Patented Feb. 6, 1912.

Application filed November 22, 1910. Serial No. 593,756.

*To all whom it may concern:*

Be it known that I, JOHN F. LINEHAN, a citizen of the United States of America, and a resident of Yonkers, county of Westchester, and State of New York, have invented certain new and useful Improvements in Reaming-Tool Holders for Pipe-Machines, of which the following is a specification.

This invention relates to an attachment to the transverse slide of machines organized for performing operations on pipe, as the cutting off and threading.

The object of the invention is to provide an attachment of this character for carrying a reaming tool suitable for removing the bur left by the cutting-off tool on the inner edge of the end of the pipe, and to so organize the attachment that the two together with its holder can be readily thrown into and out of operative position, and, when out of operative position will not interfere with the use of the machine for the cutting off or threading operations.

Figure 3:
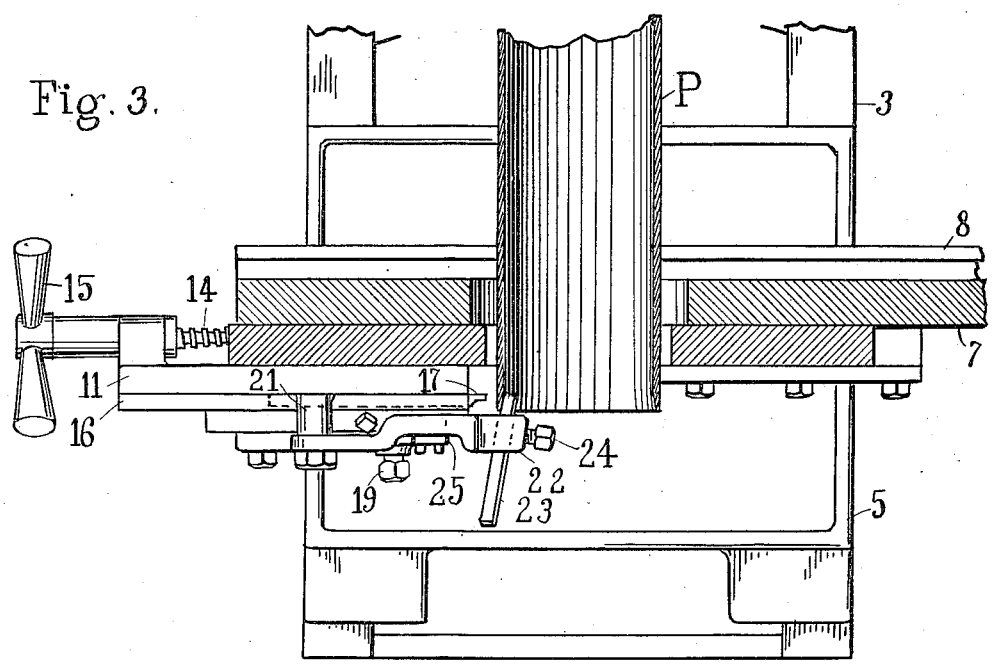
Figure 4:
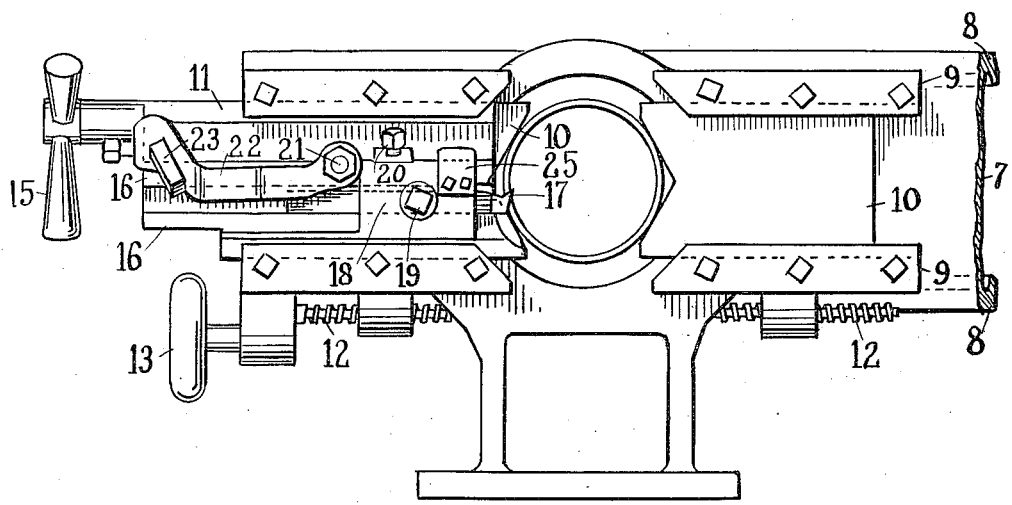

In the accompanying two sheets of drawings which form a part of this application—Figure 1 is an end view of a pipe machine showing the cutting head with the cutting-off slide and reaming-tool holder which embodies my invention in operative position. Fig. 2 is a side elevation of the same including the chuck for the pipe. Fig. 3 is a horizontal section through the cutting-head on the line III—III of Fig. 1. Fig. 4 is an end view of the cutting head showing the reaming-tool holder out of operative position.

The pipe-machine comprises a chuck 1 through which a pipe P can be passed and in which it can be clamped for rotation by power applied to a gear 2. A bed-frame 3 carries a supporting head 4 for the hollow spindle of the chuck. Ways on the bed-frame support a carriage 5 movable by a hand-wheel 6 in line with the axis of the pipe. This carriage supports a cutting-head 7 which has ways 8 8 adapted to receive a threading die and also ways 9 9 for steadying-jaws 10 10 and a transverse or cutting-off slide 11. The steadying-jaws are set up for steadying the pipe by a screw 12 operated from a hand-wheel 13, and the transverse slide is operated through a screw 14, the head of which has a suitable hand-grip 15. The transverse slide is a casting with parallel ribs 16 16 between which the cutting-off tool 17 is carried. A bridge 18 between the ribs carries a clamping screw 19 for the cutting-off tool. A second clamping screw 20 passes through one of the ribs and serves to further clamp the cutting-off tool. The transverse slide carries a stud 21, the axis of which is parallel with the axis of the pipe-machine. On this stud is pivoted one end of a reaming-tool holder 22, the other end of this holder being perforated with a square hole passing through at a suitable angle and through which passes a reaming-tool 23. This tool is a square bar of tool steel with one corner at one end suitably ground to a cutting edge. A clamping screw 24 secures the tool in the holder. When in operative position the reaming-tool holder lies upon the upper of the two ribs on the transverse slide and is thereby sufficiently supported while the reaming cut is being taken. A plate 25 screwed to the bridge of the transverse slide supports the holder against any thrust in the direction of the machine axis and relieves the pivot of such strain.

In operating the machine, after cutting off, the transverse slide is drawn back so that the end of the cutting-off tool will clear the outside of the pipe. The reaming-tool holder is then thrown over into operative position and carries with it the reaming-tool. The carriage is then moved toward the chuck to bring the cutting end of the reaming-tool within the end of the pipe. The transverse slide is then drawn back farther to bring the reaming-tool into cutting engagement and make the reaming cut.

What I claim as new, and desire to secure by Letters Patent of the United States, is—

1. The combination in a pipe-machine with means for rotating pipe, of a carriage movable in line with the axis of the pipe, a cutting-off slide supported by the carriage, and a reaming-tool holder pivoted to the cutting-off slide and supported by the cutting-off slide when in operative position with the reaming tool beyond the cutting-off tool, substantially as described.

2. The combination in a pipe-machine with means for rotating pipe, of a carriage movable in line with the axis of the pipe, a transverse slide supported by the carriage, means carried by the transverse slide for holding a cutting-off tool, and a reaming-tool holder pivoted to the transverse slide on an axis parallel with the axis of the pipe-machine and supported by the cutting-off slide when in operative position, substantially as described.

Signed at Yonkers, N. Y., this 17th day of November, 1910.

JOHN F. LINEHAN.

Witnesses:
WILLIAM B. FINK,
GEO. H. BECKWITH.

Copies of this patent may be obtained for five cents each, by addressing the "Commissioner of Patents, Washington, D. C."